US012187201B2

(12) United States Patent
Berne

(10) Patent No.: US 12,187,201 B2
(45) Date of Patent: Jan. 7, 2025

(54) METHOD AND A SYSTEM FOR THE MANAGEMENT OF AN ASSISTANCE SYSTEM FOR A WINDSCREEN OF A CAB OF A VEHICLE

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

(*) Notice: Subject to any disclaimer, the term of this patent is extended or adjusted under 35 U.S.C. 154(b) by 0 days.

(21) Appl. No.: 17/412,301

(22) Filed: Aug. 26, 2021

(65) Prior Publication Data
US 2022/0073010 A1    Mar. 10, 2022

(30) Foreign Application Priority Data
Sep. 9, 2020   (EP) .................................... 20195219

(51) Int. Cl.
    *B60R 11/04*     (2006.01)
    *B60J 1/00*     (2006.01)
    (Continued)

(52) U.S. Cl.
    CPC .............. *B60R 11/04* (2013.01); *B60J 1/002* (2013.01); *B60J 1/02* (2013.01); *G06T 7/70* (2017.01);
    (Continued)

(58) Field of Classification Search
CPC .... B60J 1/002; B60J 1/02; B60R 1/25; B60R 1/26; B60R 11/04; B60R 2011/0026;
(Continued)

(56) References Cited

U.S. PATENT DOCUMENTS 11,091,127 B1 * 8/2021 Wolfe ..................... B60S 1/524
2006/0061656 A1 * 3/2006 Lang ....................... B60R 11/04
                                                                         348/148
(Continued)

FOREIGN PATENT DOCUMENTS

DE     102005030838 A1     1/2007
DE     102012012783 A1 * 12/2013   ............... B60R 1/00
(Continued)

OTHER PUBLICATIONS

Extended European Search Report for European Patent Application No. 20195219.9, mailed Feb. 24, 2021, 9 pages.

*Primary Examiner* — Christopher S Kelley
*Assistant Examiner* — Asmamaw G Tarko
(74) *Attorney, Agent, or Firm* — Withrow & Terranova, PLLC

(57) ABSTRACT

The invention relates to a management method of an assistance system for a windscreen of a cab of a vehicle, the vehicle comprising a camera assembly including at least one camera located on the top of the windscreen with an angle between 25° and 75° with respect to the windscreen, for providing a captured image of a wide angle field of view located in front of the vehicle, said wide angle field of view comprising a first front field of vision, a second field of vision of a front-view and a third rear field of the vision, the method comprising:
    Determining a state of the windscreen using the at least one camera and
    Processing the captured image, according to the state of the windscreen, to operate the windscreen system on the windscreen.

16 Claims, 1 Drawing Sheet

(51) Int. Cl.
  *B60J 1/02* (2006.01)
  *B60R 11/00* (2006.01)
  *G06T 7/70* (2017.01)

(52) U.S. Cl.
  CPC . *B60R 2011/0026* (2013.01); *B60R 2011/004* (2013.01); *B60R 2011/005* (2013.01); *G06T 2207/30252* (2013.01)

(58) Field of Classification Search
  CPC ......... B60R 2011/004; B60R 2011/005; B60R 2300/108; B60R 2300/40; B60R 2300/802; B60R 2300/8053; B60R 2300/8093; B60S 1/0844; G06T 2207/30252; G06T 7/70
  USPC .......................................................... 348/148
  See application file for complete search history.

(56) References Cited

U.S. PATENT DOCUMENTS

| | | | | |
|---|---|---|---|---|
| 2008/0198227 | A1* | 8/2008 | Cieler | .................... B60R 11/04 |
| | | | | 348/148 |
| 2009/0128629 | A1 | 5/2009 | Egbert et al. | |
| 2012/0062741 | A1* | 3/2012 | Stimel, Jr. | ................. B60R 1/00 |
| | | | | 348/148 |
| 2015/0085118 | A1 | 3/2015 | Ahiad et al. | |
| 2017/0064221 | A1 | 3/2017 | Taylor et al. | |
| 2019/0299886 | A1* | 10/2019 | Rushton | .................. B60R 11/04 |
| 2020/0262362 | A1* | 8/2020 | van den Brink | ......... B60J 3/023 |
| 2020/0406819 | A1* | 12/2020 | Berne | ....................... B60R 1/10 |
| 2021/0206240 | A1* | 7/2021 | Berne | ....................... B60R 1/00 |
| 2021/0237662 | A1* | 8/2021 | Berne | .................. G03B 17/561 |
| 2021/0253066 | A1* | 8/2021 | Shirakura | ............... B60S 1/583 |
| 2021/0402925 | A1* | 12/2021 | Berne | ....................... B60R 1/00 |
| 2022/0009454 | A1* | 1/2022 | Ariyoshi | .................. B60S 1/52 |
| 2022/0073010 | A1* | 3/2022 | Berne | .................... B60R 11/04 |
| 2022/0080929 | A1* | 3/2022 | Herrada | .................. B60S 1/482 |

FOREIGN PATENT DOCUMENTS

| | | |
|---|---|---|
| DE | 102014214710 A1 | 1/2016 |
| DE | 102019107287 A1 | 10/2019 |
| EP | 2774815 A1 | 9/2014 |
| WO | 2006015905 A1 | 2/2006 |
| WO | 2011153989 A2 | 12/2011 |
| WO | 2017162609 A1 | 9/2017 |

\* cited by examiner

METHOD AND A SYSTEM FOR THE MANAGEMENT OF AN ASSISTANCE SYSTEM FOR A WINDSCREEN OF A CAB OF A VEHICLE

RELATED APPLICATIONS

The present application claims priority to European Patent Application No. 20195219.9, filed on Sep. 9, 2020, and entitled "METHOD AND SYSTEM FOR THE MANAGEMENT OF AN ASSISTANCE SYSTEM FOR A WINDSCREEN OF A CAB OF A VEHICLE," which is incorporated herein by reference in its entirety.

TECHNICAL FIELD

The invention relates to a method and a system for the management of an assistance system for a windscreen of a cab of a vehicle.

The invention can be applied in heavy-duty vehicles, such as trucks, buses and construction equipment. Although the invention will be described with respect to a truck, the invention is not restricted to this particular vehicle, but may also be used in other vehicles such as a car.

BACKGROUND

A motor vehicle is conventionally equipped with a system for wiping and washing the surface of the glass fitted to the vehicle, and in particular the vehicle windscreen.

Such a wiping and washing system makes it possible to maintain a clear driver vision and prevent the environment driver vision from being disturbed, in particular when the vehicle is driving in the rain, in the snow, in harsh road or in negative temperature.

A wiping and washing system may typically include one or more wiper blades, each of which is designed to clean at least part of the windscreen, in particular so as to remove water and dirt spattered on the windscreen.

A wiping and washing system also conventionally includes projection nozzles are, for example, arranged on a body part of the vehicle in the vicinity of the windscreen or integrated into the wiper blade.

The wiping system can be linked to an optical sensor, which detects raindrops, and thus the wiping system can be automatically activated when raindrops are detected.

The optical sensor is traditionally positioned inside the windscreen and therefore can impair the driver view field.

Additionally, the field of view of the optical sensor is narrow and therefore, the analysis of the windscreen is not complete.

SUMMARY

An object of the invention is to provide an optimized method for managing a vehicle windscreen, in particular a truck windscreen, based on precise and specific data relating to the state of the windscreen. Moreover, the object of the present invention is to provide a reliable system to manage easily that windscreen.

The object is achieved by a management method of an assistance system for a windscreen of a cab of a vehicle, the vehicle comprising a camera assembly including at least one camera located on the top of the windscreen with an angle between 25 and 75° with respect to the windscreen, for providing a captured image of a wide angle field of view located in front of the vehicle, said wide angle field of view comprising a first front field of vision, a second field of vision of a class VI front-view according to the Regulation UN ECE n°46 and a third rear field of the vision, the method comprising:

Determining a state of the windscreen using the at least one camera and

Processing the captured image, according to the state of the windscreen, to manage the windscreen system on the windscreen.

By the provision of the method according to the present invention, it is believed that the location of the camera with the specific angle for providing a captured image based on the most part of the windscreen. Thus, the state of the windscreen is well analysed and the management of the windscreen with the windscreen system is highly efficient.

In one embodiment, the angle of field of vision of the at least one camera is between 150 and 180°. In this case, the camera captured a wide angle field of view located in front of the vehicle including the windscreen of the vehicle.

In one embodiment, the first front field of vision corresponds to a first part of the captured image, the second field of view corresponds to a second part of the captured image and the third field of view corresponds to a third part of the captured image.

In one embodiment, the processing of the captured image is based at least on the third part of the captured image. Indeed, it is believed that the third part can include the widest part of the vehicle windscreen. Alternatively, the captured image can also include data based on the first front field view or the second field of view.

In one embodiment, the third rear field of vision provides the captured image including at least 60%, preferably at least 70%, more preferably at least 80% and advantageously at least 90% of the windscreen. In this embodiment, it is believed that compared to the methods and systems of the prior art, it is believed that almost, even all, of the windscreen can be captured increasing the data on the state of the windscreen for the processing step.

The camera assembly including the at least one camera is located on the top of the windscreen with an angle between 25 and 75°, preferably between 40 and 60°, with respect to the windscreen. This angle allows improving the view of the windscreen. Thus, more precise and specific details are captured on at least a wide part of windscreen.

In one embodiment, the camera assembly comprises the at least one camera mounted on at least one side of the windscreen, i.e. on the left or on the right side of the windscreen.

In one embodiment, the camera assembly comprise two cameras, each being located on each side of the windscreen.

In one embodiment, the state of the windscreen is chosen from among: clean, snowy, wet, dirty and/or frost. In this embodiment, the camera captures and determines the place where the windscreen is not clean, i.e. snowy, wet, dirty, frost, etc. Then, the captured image is processed to manage the windscreen system depending on its state.

In one embodiment, the windscreen system comprises a wiping system, a cleaning system and/or a heating system. Indeed, it is believed that many different data can be captured by the camera and then analyzed leading to a wide windscreen assistance system.

In one embodiment, the wiping system comprises wiping blades. In this embodiment, the wiping speed and/or the wiping angle can be adjusted.

In one embodiment, the cleaning system comprises cleaning nozzles. In this embodiment, the cleaning flow can be adjusted.

In one embodiment, the heating system comprises a heating foils system or a heating air system. In this embodiment, the heating temperature, the heating time, the heated windscreen zone can be adjusted.

In one embodiment, the windscreen system can manage the cleaning, the wiping, the heating and/or the defrosting of the windscreen depending on the state of the windscreen.

According to a second aspect, the invention relates to a system for the management of an assistance system for a windscreen of a cab of a vehicle, the vehicle comprising a camera assembly including at least one camera located on the top of the windscreen with an angle between 25 and 75° with respect to the windscreen, for providing a captured image of a wide angle field of view located in front of the vehicle, the system comprising:
A controller capable of receiving a state of the windscreen from the at least one camera and of processing the captured image, according to the state of the windscreen, to manage the windscreen system on the windscreen and
a windscreen system.

According to a third aspect, a vehicle comprising:
A cab including a windscreen having front and rear wheels,
A vehicle internal communication network,
A system according to the present invention, Wherein the at least one camera assembly, the windscreen system and the controller of the system are linked by the vehicle internal communication network.

In one embodiment, the vehicle comprises an electrical control unit, the controller being linked to the electrical control unit or integrated into the electrical control unit.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the following description, X is defined as the longitudinal direction of the vehicle 1, Y is defined as the transversal direction and Z is defined as the vertical direction of the vehicle 1.

Figure 1:
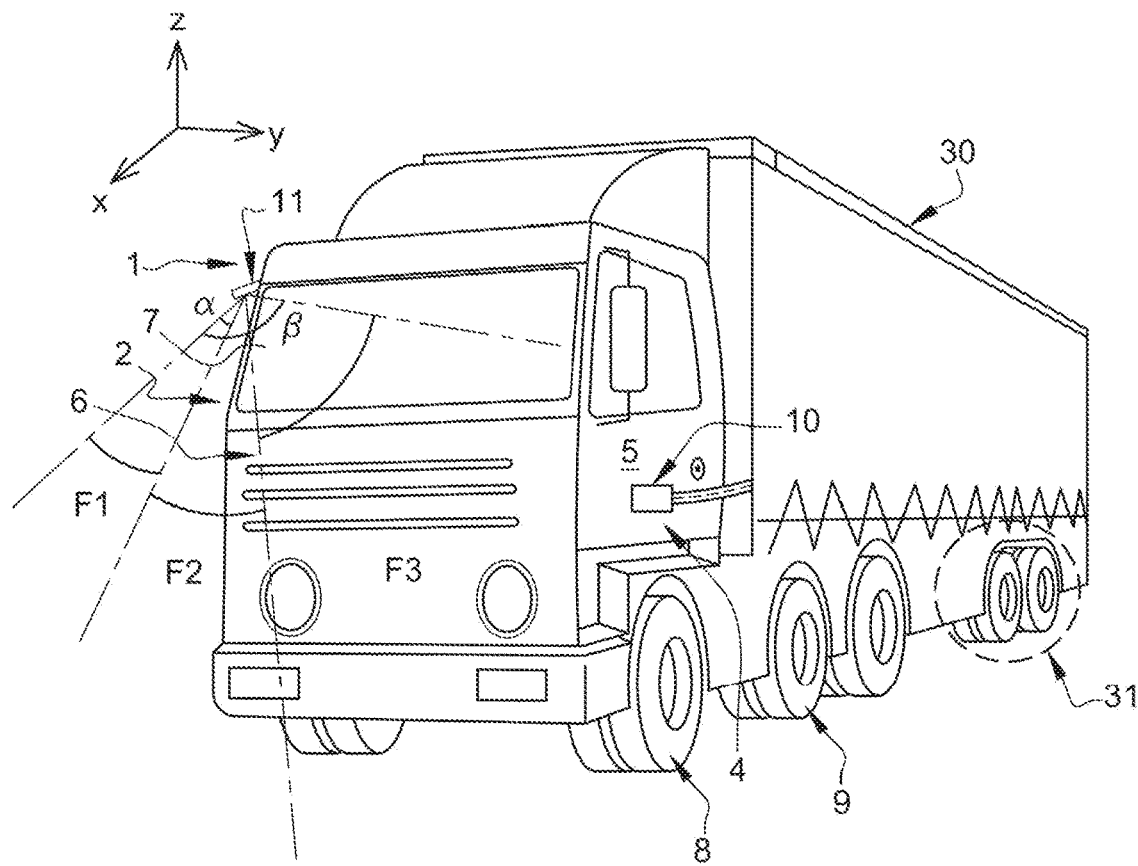
FIG. 1 is a perspective view of a vehicle according to the invention.
Figure 2:
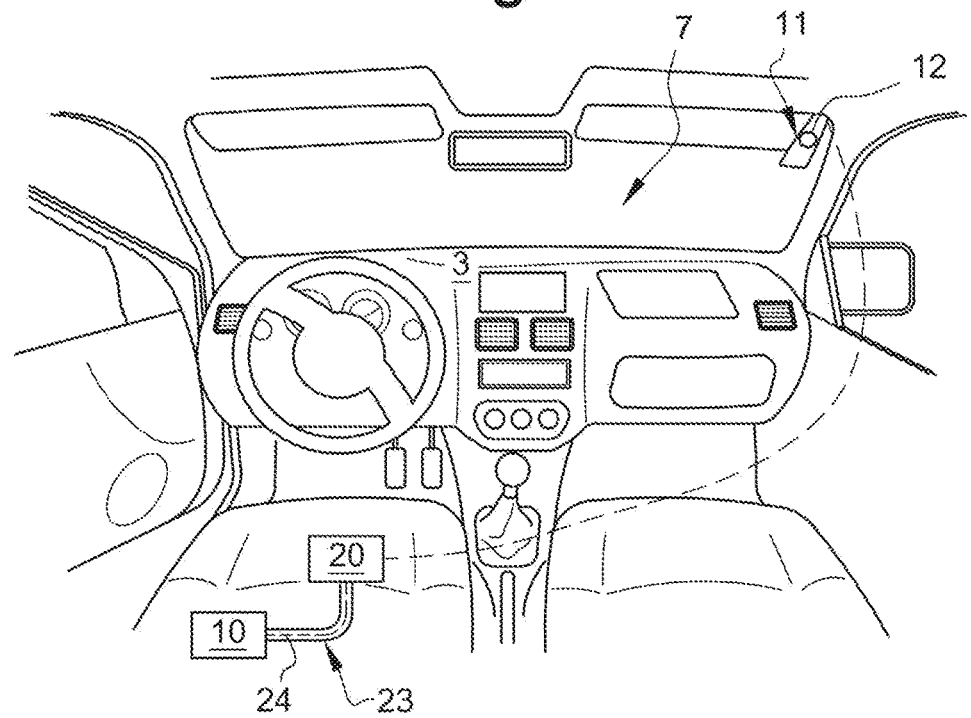
FIG. 2 is a perspective view forward from the interior of a vehicle.

As illustrated in FIGS. 1 and 2, the vehicle 1 comprises a cab 2 defining a driver's compartment 3. The cab 2 has side walls 4 each comprising a door 5 and a front wall 6 including a windscreen 7. The vehicle 1 further comprises front wheels 8, and rear wheels 9.

FIG. 1 illustrates an example wherein the vehicle 1 is a truck having a trailer and rear wheels 31.

The vehicle 1 can also comprise an image capturing assembly 11 mounted on the front wall of the cabin. The image capturing assembly 11 is configured to be placed outside of the cab 2. The image capturing assembly 11 is located on the upper part of the cab 2 and, preferably, above the windscreen 7. The image capturing assembly 11 can also be secured on the cab roof panel overlooking the vehicle front area. The image capturing assembly 11 can be located ideally on the top centre of the windscreen 7 or can be located on the top side of the windscreen 7.

The image capturing assembly 11 includes at least one camera 12 located on the top right of the windscreen 7 with an angle α between 25 and 75° with respect to the windscreen 7 for providing a captured image of a wide angle field of view located in front of the vehicle 1. The image capturing assembly 11 is part of a so-called camera monitoring system (CMS) and provides the driver with an image of truck front area.

For example, the angle β of the field of vision of the camera can be between 150 and 180°. The field of vision of the camera 11 can comprise a first front field of vision F1, a second field of vision F2 of a class VI front-view according to the Regulation UN ECE n ° 46 and a third windscreen field of the vision F3.

The first front field of vision F1 corresponds to a first part of the captured image (not shown), the second field of view F2 corresponds to a second part of the captured image (not shown) and the third field of view F3 corresponds to a third part of the captured image (not shown). For example, the first part of the captured image can provide data, for example, to the collision system of a vehicle. The second part of the captured image can be the one displayed for example on a monitor for the driver to improve its visibility. For example, the third rear field of vision F3 provides a captured image including at least 60% of the windscreen 7.

As shown in FIG. 2, the vehicle 1 can comprise a system for the management of an assistance system (not shown) for a windscreen 7 of a cab 2 of a vehicle 1 comprising a controller 20 and a windscreen system (not shown). The controller 20 can be linked to the electrical control unit (ECU) 10 via a vehicle CAN bus 23 including an electrical wiring 24. The network 23 is configured to establish electric connection and communication between the camera assembly 11, the system and various components.

The method for the management of an assistance system for a windscreen 7 of a cab 2 of a vehicle 1 comprises determining the state of the windscreen 7 using the camera assembly 11 and processing the captured image, according to the state of the windscreen, to manage the windscreen system on the windscreen 7.

The camera assembly 11 provides a state of the windscreen 7 chosen from among: clean, snowy, wet, dirty or frost. For example, the camera assembly 11 determines when the windscreen 7 is wet if it is raining outside. For example, the camera assembly 11 determines when the windscreen 7 is snowy if it is snowing outside. For example, the camera assembly 11 determines that when the windscreen 7 is frost if the temperature is below 0° outside. For example, the windscreen 7 is dirty if the vehicle 1 goes through the mud.

Then, the controller 20 can receive a state of the windscreen 7 from the camera 12 and processes the captured image to manage the windscreen system on the windscreen 7. For example, the wiping system turns on when the windscreen 7 is wet. For example, the cleaning system turns on when the windscreen 7 is dirty or snowy. For example, the heating system turns on when the windscreen 7 is frost or snowy.

The wiping system can comprise wiping blades. For example, the camera 12 based on the first front field of view F1 can capture soiling in front of the vehicle and based on the third field of view F3 can capture the state of the windscreen 7 so that the wiping parameters are adapted. For example, the camera 12 based on the third field of view F3 can capture snow on the windscreen 7 so that the wiping angle is adjusted to avoid motor heating and system breakage.

The cleaning system can comprise cleaning nozzles.

The heating system can comprise a heating foils system, for example monitoring by a heating control or a heating air system, for example monitoring by the heating and ventilation system of the vehicle.

The present invention provides an optimized method and system to easily manage the windscreen of the vehicle, in particular of a truck, based on more precise data collected by a specific camera assembly.

It is to be understood that the present invention is not limited to the embodiments described above and illustrated in the drawings; rather, the skilled person will recognize that many changes and modifications may be made within the scope of the appended claims.

The invention claimed is:

1. A management method of an assistance system for a windscreen of a cab of a vehicle, the method comprising:
    determining a state of a windscreen of a cab of a vehicle using at least one camera of at least one camera assembly, the at least one camera having a field of vision between 150° and 180° and being located outside of the cab and on the windscreen with an angle between 25° and 75° with respect to the windscreen for providing a captured image of a wide angle field of view located in front of the vehicle, the wide angle field of view comprising a simultaneously captured first front field of vision, second field of vision of a front-view, and third rear field of vision that includes at least 60% of the windscreen, wherein the first front field of vision corresponds to a first part of the captured image, the second field of vision corresponds to a second part of the captured image and the third field of vision corresponds to a third part of the captured image; and
    processing the third rear field of vision in the captured image, according to the state of the windscreen, to operate the windscreen system on the windscreen.

2. The method of claim 1, wherein the camera assembly including the at least one camera is located on the windscreen with an angle between 4° and 60° with respect to the windscreen.

3. The method of claim 1, wherein the camera assembly comprises the at least one camera mounted on at least one side of the windscreen.

4. The method of claim 1, wherein the state of the windscreen comprises at least one of clean, snowy, wet, dirty or frost.

5. The method of claim 1, wherein the windscreen system comprises at least one of a wiping system, a cleaning system, or a heating system.

6. The method of claim 5, wherein the wiping system comprises wiping blades.

7. The method of claim 5, wherein the cleaning system comprises cleaning nozzles.

8. The method of claim 5, wherein the heating system comprises a heating foils system or a heating air system.

9. The method of claim 1, wherein the windscreen system can manage cleaning, wiping, heating and/or defrosting of the windscreen depending on the state of the windscreen.

10. A system for the management of an assistance system for a windscreen of a cab of a vehicle, the vehicle comprising a camera assembly including at least one camera having a field of vision between 150° and 180° and being located outside of the cab and on the windscreen with an angle between 25 and 75° with respect to the windscreen for providing a captured image of a wide angle field of view located in front of the vehicle, the wide angle field of view of the at least one camera comprises a simultaneously captured first front field of vision, second field of vision of a front-view, and third rear field of vision that includes at least 60% of the windscreen, wherein the first front field of vision corresponds to a first part of the captured image, the second field of vision corresponds to a second part of the captured image and the third field of vision corresponds to a third part of the captured image, the system comprising:
    a windscreen system; and
    a controller capable of receiving a state of the windscreen from the at least one camera and of processing the third rear field of vision in the captured image, according to the state of the windscreen, to manage the windscreen system on the windscreen.

11. A vehicle comprising:
    a cab including a windscreen having front and rear wheels;
    a vehicle internal communication network;
    a camera assembly including at least one camera having a field of vision between 150° and 180° and being located outside of the cab and on the windscreen with an angle between 25 and 75° with respect to the windscreen for providing a captured image of a wide angle field of view located in front of the vehicle, the wide angle field of view of the at least one camera comprises a simultaneously captured first front field of vision, second field of vision of a front-view, and third rear field of vision that includes at least 60% of the windscreen, wherein the first front field of vision corresponds to a first part of the captured image, the second field of vision corresponds to a second part of the captured image and the third field of vision corresponds to a third part of the captured image; and
    a system for the management of an assistance system for the windscreen of the cab, the system comprising:
        a windscreen system; and
        a controller capable of receiving a state of the windscreen from the at least one camera and of processing the third rear field of vision in the captured image, according to the state of the windscreen, to manage the windscreen system on the windscreen;
        wherein the camera assembly, the windscreen system, and the controller are linked by the vehicle internal communication network.

12. The vehicle according to claim 11, wherein the vehicle comprises an electrical control unit, the controller being linked to the electrical control unit or integrated into the electrical control unit.

13. The method of claim 1, wherein the first front field of vision in the captured image includes at least a portion of the area in a direction away from the vehicle.

14. The method of claim 13, further comprising processing the first front field of vision in the captured image to provide collision data to operate a collision system of the vehicle.

15. The method of claim 1, wherein the second front field of vision in the captured image includes at least a portion of the area in a direction away from the vehicle.

16. The method of claim 15, further comprising displaying the second front field of vision in the captured image to monitor viewable by a driver of the vehicle.

* * * * *